Feb. 11, 1958     A. E. ORMSBY     2,822,938
LIFT TAIL GATE
Filed Jan. 9, 1956     2 Sheets-Sheet 1
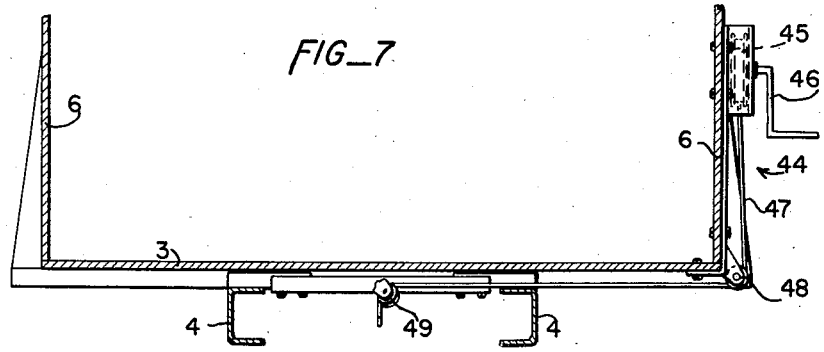
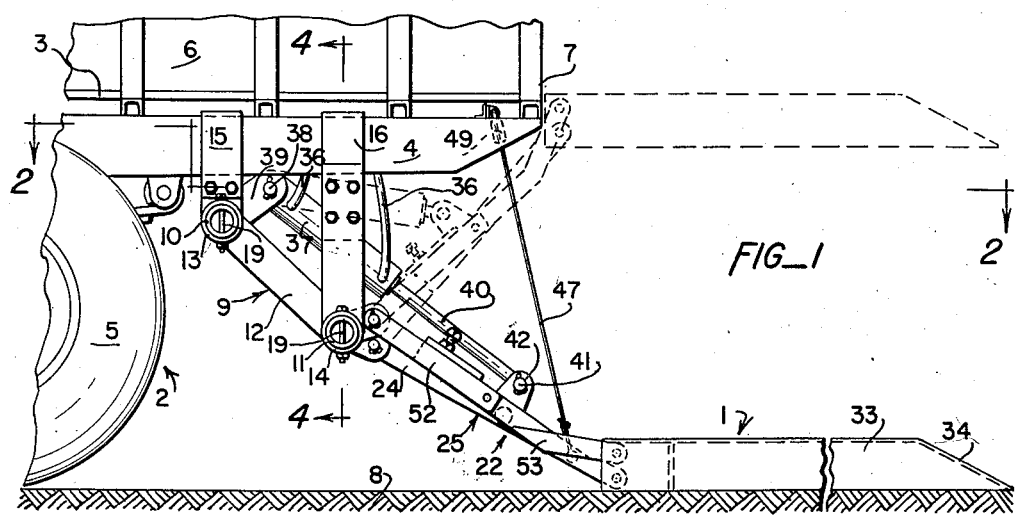
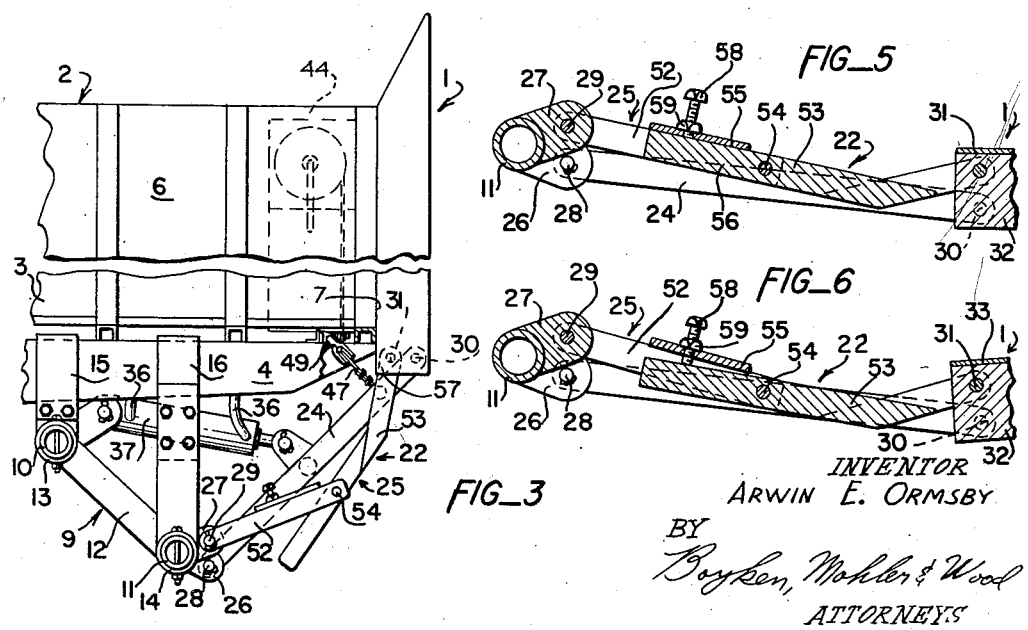
INVENTOR
ARWIN E. ORMSBY
BY
Boyken, Mohler & Wood
ATTORNEYS Feb. 11, 1958 A. E. ORMSBY 2,822,938
LIFT TAIL GATE
Filed Jan. 9, 1956 2 Sheets-Sheet 2
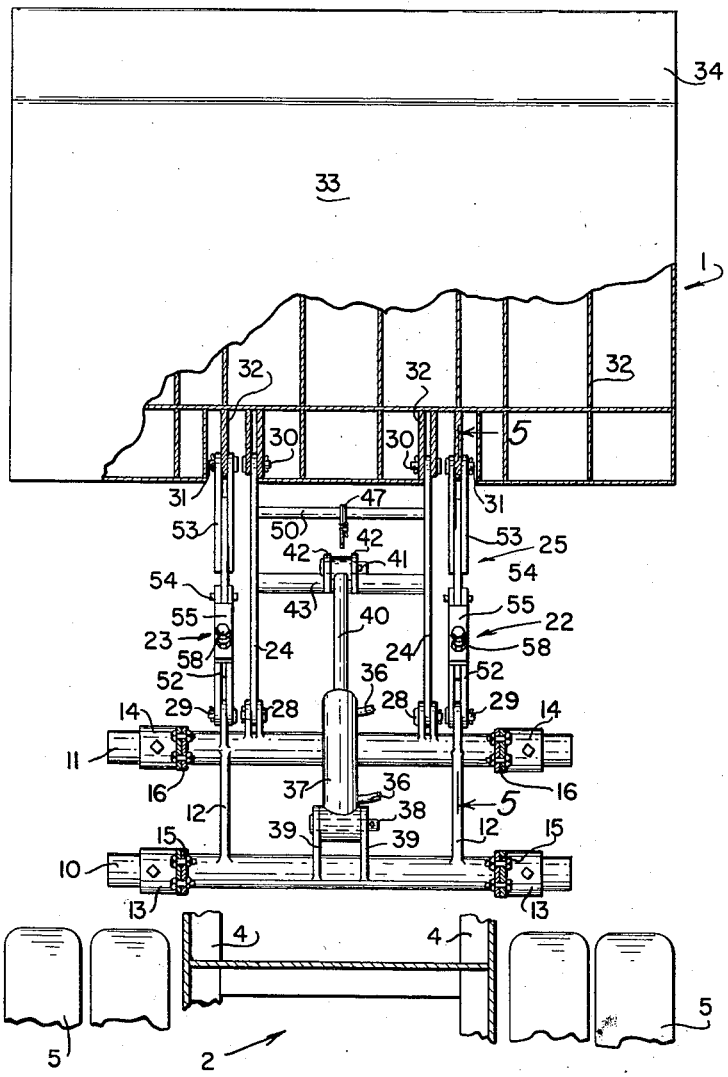
FIG_2
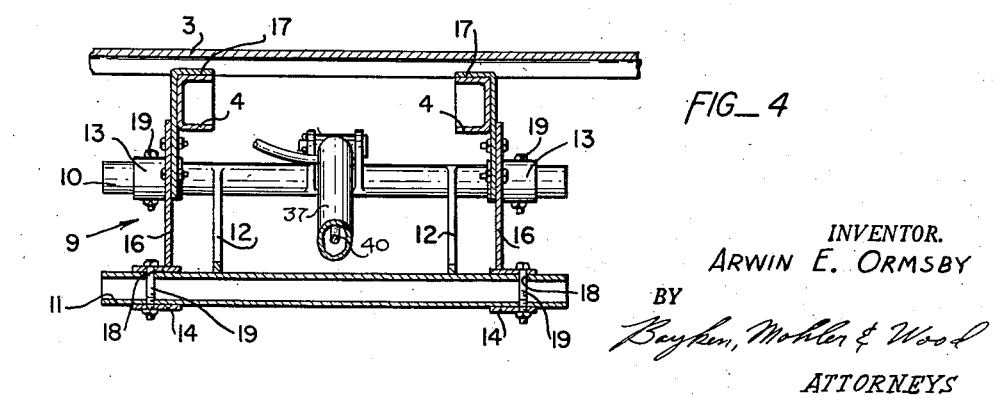
FIG_4
INVENTOR.
ARWIN E. ORMSBY
BY
ATTORNEYS

United States Patent Office 2,822,938
Patented Feb. 11, 1958

2,822,938

LIFT TAIL GATE

Arwin E. Ormsby, Oakland, Calif.

Application January 9, 1956, Serial No. 557,963

6 Claims. (Cl. 214—77)

This invention relates to lift tail gates of the type used on self loading vehicles. Various load elevating devices have been provided to assist in loading vehicles. Many prior art devices for this purpose include a movable, horizontal platform mounted on the vehicle, which platform is powered to carry the load from the ground or a loading dock to the level of the vehicle bed. Heavy objects are usually hand trucked onto the platform in its lowered position, lifted, and then trucked onto the vehicle.

It is therefore important that the platform in such a device remain relatively level during its use. Since devices of this type are subjected to repeated loading, prior known devices often sag or the parts thereof become fatigued to the extent that they must be reconstructed to be completely operative.

It is also desirable that the platform in such devices be capable of folding to a position covering the end of the vehicle bed. Not only does this provide a double use for the platform or gate, thus obviating the need for other closures for the vehicle bed, but the projection of the platform from the end of the vehicle creates an unnecessary obstruction. Previous attempts to provide such a gate have usually resulted in complicated and expensive structure which may not be rugged enough to withstand the hard usage required of a device of this type.

It is therefore an object of this invention to provide an improved lift gate for a vehicle which is simple and inexpensive to manufacture and yet rugged enough to withstand repeated heavy loading.

Another object of this invention is the provision of a lift gate which may be easily adjusted to render the load bearing platform level.

Still another object of this invention is the provision of a lift gate structure which may be readily mounted on various types and sizes of vehicles.

It is a further object of this invention to provide a lift gate for a vehicle, which gate may be automatically held in a closed position against the vehicle bed.

Other objects and advantages will become apparent from the following description taken in connection with the accompanying drawings, in which:

Fig. 1 is a side elevational view of the rear portion of a truck showing the lift gate of this invention mounted thereon;

Fig. 2 is a horizontal sectional view taken generally along line 2—2 of Fig. 1;

Fig. 3 is a side elevational view similar to Fig. 2 but showing the gate in position closing the vehicle bed;

Fig. 4 is a sectional view taken generally along line 4—4 of Fig. 1;

Figs. 5, 6 are similar sectional views taken along line 5—5 of Fig. 2; and,

Fig. 7 is an end elevational view of a vehicle, partly in section, showing an alternate form of means for lifting the gate.

In detail, the tail gate of this invention, generally designated 1 (Fig. 1), is adapted for use with a variety of vehicles, such as truck 2 having a load carrying bed 3.

Bed 3 of such a vehicle is ordinarily supported on a frame, including longitudinal frame members 4, which are supported on ground wheels 5. It will be understood that vehicles of this type are constructed in various different ways, but at most include at least load carrying bed 3 and a pair of spaced longitudinal frame members 4 as shown in Fig. 4. Bed 3 may also be provided with spaced, opposed side panels 6 as in the case of a pick-up truck or the like.

Bed 3 is open at the rear end 7 (Fig. 1) so that objects may be loaded into said bed from said end. Gate 1 is mounted for movement between the ground 8 or a loading dock or the like and the open end 7 of bed 3 (as shown in the dotted line position of Fig. 1). In order to so mount gate 1, a mounting frame, generally designated 9, is provided. Frame 9 comprises a pair of spaced, parallel, tubular bars 10, 11 extending generally transversely of longitudinal frame members 4 of the truck 2. Said bars are connected in said spaced relation by a spaced pair of braces 12, which may be welded to said bars.

The opposite ends of bars 10, 11 are each slidably received in a pair of tubular sleeves 13, 14 (Fig. 2). Said pairs of sleeves each have extending upwardly therefrom a pair of brackets 15, 16, each of which pair of brackets have oppositely inwardly extending flanges 17 at their upper ends (Fig. 4). Flanges 17 are adapted to hook over longitudinal frame members 4 so as to support brackets 15, 16 and sleeves 13, 14 depending therefrom. Flanges 17 may be secured in the correct location to frame members 4 by any suitable means, such as welding. The location of brackets 15, 16 along frame member 4, will, of course, depend upon the relation of gate 1 to bed 3 of the truck, as will be later described.

The length of brackets 15, 16 may be made adjustable by constructing said brackets in two parts and bolting the parts together as shown in Figs. 1, 3, 4. Since sleeves 13, 14 slidably receive bars 10, 11 the latter may be shifted transversely of the vehicle to the correct location.

Sleeves 13, 14 are provided with holes 18 therethrough, which holes may be used as a guide for drilling or cutting holes in bars 10, 11 at the correct location. Once mounting frame 9 has been adjusted to its correct location with respect to the particular vehicle on which it is secured, bolts 19 may be inserted through holes 18 and the holes formed in bars 10, 11 to secure said bars in their correct relationship with sleeves 13, 14. In this manner, it is seen that mounting frame 9 may be adapted to fit various frame conditions on different sizes and types of vehicles.

For connecting tail gate platform 1 to mounting frame 9 a pair of parallel acting linkages, generally designated 22, 23 is provided. Each said linkages includes a rigid compression link or arm 24 and a two-part tension link or arm 25. Arms 24, 25 are vertically spaced one above the other and are substantially equal in effective length between their opposite pivoted ends. Arms 24, 25 of each linkage 22 are pivoted at one end to a pair of ears 26, 27 projecting from bar 11 by pivot pins 28, 29 respectively (Fig. 5). At their opposite ends, said arms are pivotally connected to gate 1 by pivot pins 30, 31, respectively. The distance between pivot pins 28 and 29 is equal to the distance between pivot pins 30 and 31 so that arms 24, 25 swing gate 1 in parallel motion about pins 28, 29.

Pins 30, 31 may extend through ribs 32 (Fig. 2) of gate 1 for the purpose of connecting said arms to said gate. Gate 1 preferably comprises a grid of such vertically upstanding ribs 32 covered by generally planar surface sheet 33 of steel or the like. Sheet 33 forms the upper surface of gate 1 or the platform on which the load is placed for lifting to the truck bed 3. Such platform may be provided with a slantingly disposed end ramp 34

(Figs. 1, 2) for trucking articles onto surface 33. It will be understood that gate 1 may be constructed in various ways of which the box structure in Fig. 2 may be preferable.

Gate 1 is connected to linkages 22, 23 so as to be substantially horizontal as shown in Fig. 1. By swinging linkages 22, 23 through a vertical arc, said gate remains horizontal for carrying a load from the lower grounded position shown in solid lines in Fig. 1 to the upper dotted position adjacent and generally coplanar with bed 3 of the vehicle to be loaded. It will be noted that when gate 1 is carrying a load, lower arm 24 of each linkage is under compression and upper arm 25 is under tension.

Various means may be provided for swinging linkages 22, 23 and gate 1 up to the truck bed. One such means may be provided in the form of an hydraulic cylinder 37 (Figs. 1, 2) which has one end pivotally secured, as by pin 38, to a pair of ears 39 projecting from bar 10. Piston rod 40 of said cylinder may be pivotally connected by pin 41 to a pair of ears 42 mounted on a cross brace 43 secured between arms 24 (Fig. 2). It is obvious that cross brace 43 may as well be secured between arms 25 and the other end of cylinder 37 could be connected anywhere rigid with the frame of the vehicle, the only requirement being that cylinder 37 exert a lifting force on parallel linkages 22, 23. Said cylinder may be connected to any suitable hydraulic pump (not shown) by lines 36.

Alternative means for lifting the gate may be provided in the form of a cable hoist generally designated 44, shown in Figs. 1, 7. Hoist 44 comprises a rotatable drum 45 which may be mounted in bearings on side panels 6 of the truck and rotated by removable hand crank 46. A hoist cable 47 is secured on drum 45 and extends downwardly therefrom around corner pulley 48, over swivel mounted pulley 49 centrally of bed 3, and is secured at its free end to a cross bar 50 extending between arms 24 (Fig. 2). Rotation of crank 46 causes swinging of parallel linkages 22, 23 from the solid line position of Fig. 1 to the dotted line position in a manner similar to the operation of hydraulic cylinder 37.

It will be noted that tail gate 1 remains generally horizontal while swinging from the lower position to the upper position as long as tension arms 25 remain straight. However, it is desirable to be able to rotate gate 1 to the vertical position shown in Fig. 3 for the purpose of closing the open end of bed 3 of the vehicle. For this purpose each arm 25 comprises a pair of links 52, 53 which are foldable about a common central pivot 54. Link 52 may comprise a pair of spaced, parallel bars rigidly secured together by top plate 55 (Figs. 2, 5). A portion 56 of link 53 extends past pivot 54 and between the bars of link 52 for engagement with top plate 55 to prevent folding of links 52, 53 in one direction. The other end of link 53 may be bifurcated for connection to rib 32 of gate 1 by pivot pin 31.

In this manner when arm 25 is under tension, as when gate 1 is loaded, said arm will remain straight and cause gate 1 to be horizontal throughout its movement. Said gate may be rotated about pivot pins 30, however, which will cause arm 25 to fold about pivot 54 thereby decreasing its length between pivot pins 29 and 31, as shown in Fig. 3.

It is also to be noted that pivot pins 30, 31 connect arms 24, 25 to gate 1 near the lower and upper corners, respectively, of the front edge thereof when the gate is horizontal. The structure illustrated prevents rotation of gate 1 to the horizontal position from the vertical position shown in Fig. 3 when the gate is in vertical position because of the interference of upper front corner 57 with the end 7 of bed 3 and frame 4 of the vehicle. To achieve this result it is necessary to rotate gate 1 to the vertical position before said gate is lifted to a position closely adjacent to the open end 7 of bed 3. Then, after gate 1 is rotated to the position of Fig. 3, said gate may be brought closely adjacent the open end 7 of the vehicle by further lifting by either hydraulic cylinder 37 or cable hoist 44, whichever may be used. In such latter position rotation of gate 1 about pivot pin 30 is impossible because of the aforementioned interference of corner 57 of said gate with frame 4.

During loading and unloading of the vehicle, it is desirable that gate 1 remains horizontal for carrying loads. Due to wear and fatigue of the material of the parts involved, strain on the rear or ramp 34 end of gate 1 may cause the same to sag from the horizontal. Hence, an adjustment screw 58 having a lock nut 59 thereon is threadedly received through top plate 55 for engaging portion 56 of link 53. As shown in Figs. 5, 6, the angularity between links 52 and 53 may be adjusted by screwing screw 58 in or out so as to adjust the upper surface 33 of gate 2 to the horizontal. Once the adjustment has been made, lock nut 55 may be tightened to retain screw 58 in the correct adjusted position. Fig. 6 has been exaggerated to some extent to show this adjustment, it being understood that usually only a slight adjustment will be necessary.

Although the invention has been described and illustrated in detail, such is not to be taken as restrictive thereof, since it is obvious that modifications could be made in the description without departing from the spirit and scope of the invention.

I claim:

1. A lift tail gate for vehicles comprising a horizontally disposed bar adapted to be secured transversely of the frame of a vehicle under the rear of the bed thereof, a pair of spaced parallel-acting linkages connected at one end to said bar by pivots for swinging through generally vertical arcs, a horizontal platform extending between and connected at its forward edge by pivots to the other end of said pair of linkages for swinging by said pair from a position coplanar and adjacent the loading end of the bed of the vehicle to a grounded position spaced below said bed, means connected between said vehicle and said linkages for so swinging said platform, means for securing said bar to the frame of a vehicle including a pair of sleeves slidable on said bar, brackets attached to said sleeves and adapted to be secured to longitudinal frame members of said vehicle, and removable means for securing said sleeves to said bar whereby said sleeves and said brackets may be adjusted to fit varying spacings of said longitudinal frame members before securing said removable means.

2. A lift tail gate for vehicles comprising a horizontally disposed bar adapted to be secured transversely of the frame of a vehicle under the rear of the bed thereof, a pair of spaced parallel-acting linkages connected at one end to said bar by pivots for swinging through generally vertical arcs, each linkage including a rigid lower compression link and an upper tension link foldable on itself about a central pivot, a horizontal platform extending between and connected at its forward edge by pivots to the other end of said pair of linkages for swinging by said pair from a position coplanar and adjacent the loading end of the bed of the vehicle to a grounded position spaced below said bed, and means connected between said vehicle and said linkages for so swinging said platform, whereby said platform may be rotated to a generally vertical position upon folding of said upper links for forming a closure for said loading end of said bed.

3. A lift tail gate for vehicles comprising a horizontally disposed bar adapted to be secured transversely of the frame of a vehicle under the rear of the bed thereof, a pair of spaced parallel-acting linkages connected at one end to said bar by pivots for swinging through generally vertical arcs, each linkage including a rigid lower compression link and an upper tension link foldable on itself about a central pivot, a horizontal platform extending between and connected at its forward edge by pivots to the other end of said pair of linkages for swinging by said pair from a position coplanar and adjacent the loading end of the bed of the vehicle to a grounded position spaced below said bed, and means connected between said vehicle and said linkages for so swinging said platform, whereby said platform may be rotated to a generally vertical position upon folding of said upper links for forming a closure for said loading end of said bed, and an adjustable stop cooperating with each upper link for preventing folding of said upper link in one direction and for adjusting the angularity of said upper link about said central pivot to thereby adjust its length.

4. A lift tail gate for vehicles comprising a horizontally disposed bar adapted to be secured transversely of the frame of a vehicle under the rear of the bed thereof, a pair of spaced parallel-acting linkages connected at one end to said bar by pivots for swinging through generally vertical arcs, each linkage including a rigid lower compression link and an upper tension link foldable on itself about a central pivot, a horizontal platform extending between and connected at its forward edge by pivots to the other end of said pair of linkages for swinging by said pair from a position coplanar and adjacent the loading end of the bed of the vehicle to a grounded position spaced below said bed, and means connected between said vehicle and said linkages for so swinging said platform, said means including an hydraulic cylinder and piston connected between said lower links and the frame of said vehicle, and a source of fluid under pressure for operating said cylinder.

5. A lift tail gate for vehicles comprising a horizontally disposed bar adapted to be secured transversely of the frame of a vehicle under the rear of the bed thereof, a pair of spaced parallel-acting linkages connected at one end to said bar by pivots for swinging through generally vertical arcs, each linkage including a rigid lower compression link and an upper tension link foldable on itself about a central pivot, a horizontal platform extending between and connected at its forward edge by pivots to the other end of said pair of linkages for swinging by said pair from a position coplanar and adjacent the loading end of the bed of the vehicle to a grounded position spaced below said bed, and means connected between said vehicle and said linkages for so swinging said platform, said means including a cable hoist connected to said lower links.

6. In combination with a vehicle having an open ended, load carrying bed, a tail gate and lifting device comprising: a generally planar member adapted to receive and support a load when horizontal, a parallel acting linkage including a pair of vertically spaced arms pivotally connected to the frame of said vehicle and to said member for swinging said member between a position coplanar with said bed and a position spaced below said bed, the upper arm of said pair being under tension when said member is loaded and nonextensible but adapted to contract in length for swinging said member about the pivotal connection between the lower arm of said pair and said member to a generally vertical position, and power means connected to said lower arm for swinging said lower arm about the pivotal connection between said lower arm and said frame, said power means and said lower arm including the placement of said first mentioned pivotal connection being adapted to prevent swinging of said member from a generally vertical position adjacent said open end of said bed by providing interference between said member and said bed.

References Cited in the file of this patent
UNITED STATES PATENTS

| | | |
|---|---|---|
| 2,527,818 | Ives | Oct. 31, 1950 |
| 2,624,477 | Messick | Jan. 6, 1953 |
| 2,626,067 | Berford et al. | Jan. 20, 1953 |
| 2,683,539 | Corley | July 13, 1954 |
| 2,719,637 | Wood | Oct. 4, 1955 |
| 2,725,152 | Gwinn | Nov. 29, 1955 |